UNITED STATES PATENT OFFICE 2,132,675

ACYLATED ETHERS AND PROCESS FOR MAKING SAME

Herman A. Bruson and John W. Eastes, Philadelphia, Pa., assignors to Röhm & Haas Company, Philadelphia, Pa.

No Drawing. Application April 8, 1937,
Serial No. 135,672

32 Claims. (Cl. 260—64)

This invention relates to new compounds which are obtained by condensing aryloxy alkyl halides with an acylating agent in the presence of a catalyst of the Friedel-Crafts type.

It is well known that compounds containing an aromatic nucleus can be condensed by means of anhydrous aluminum chloride with a compound containing an aliphatically bound halogen atom whereby hydrogen halide is split out. We have now found that, in certain cases when the aromatic nucleus and the aliphatically bound halogen atom are part of the same molecule, aluminum chloride will not bring about a condensation between two molecules of the same compound. Compounds of this kind are those in which the halogen atom and the aromatic nucleus are separated from each other by a chain consisting of at least one alkoxy group containing more than one carbon atom between the halogen and the oxygen atoms. Such compounds may be designated by the general formula $$R'-(O-C_nH_{2n})_xY$$

in which R' is an aromatic radical nuclearly attached to the oxygen atom, Y is a halogen atom, x is an integer less than four and n is an integer greater than one. Typical examples of these ether chlorides are β-phenoxyethyl chloride

and β-phenoxy-β'-chlorodiethyl ether

We have also found that the ether chlorides of this kind can be condensed by means of Friedel-Crafts catalysts, with an acylating agent, without involving the terminal chlorine atom of the ether chloride. By means of such condensation there is obtained a wide variety of products having an acylated aromatic radical at one end of an alkoxy or polyalkoxy chain and a halogen atom at the other end. This halogen atom can be replaced by other means as will be pointed out below.

By the term "acylating agent" as used herein is meant any agent capable of introducing an acyl, keto, or substituted keto or acid group by the Friedel-Crafts reaction into an aromatic nucleus. Typical acylating agents are phosgene, thionyl chloride, carbon tetrachloride, organic monocarboxylic acids, and polycarboxylic acids or their anhydrides, and acyl halides of monobasic and polybasic organic acids. For instance, typical organic acylating agents are the fatty acids, their anhydrides, chlorides, bromides, and iodides, the anhydrides of polycarboxylic acids, such as succinic, maleic, glutaric, and phthalic anhydride; the polycarboxylic acid halides, such as succinyl chloride, phthalyl chloride, sebacyl chloride, and the like; furthermore, aromatic and heterocyclic acid chlorides, such as benzoyl chloride, naphthoyl chloride, furoyl chloride, and other acids, anhydrides, and acid halides of the aliphatic, aromatic, cycloaliphatic and heterocyclic series.

By the process of this invention, it thus becomes possible to synthesize a wide variety of valuable aromatic ether halides in which the aromatic nucleus is attached to acyl radicals of the most diverse nature.

These new compounds have the general formula

in which R is an acyl group derived from one of the acylating agents mentioned above, R' is an aromatic radical, Y is a halogen atom, n is an integer greater than one and x is an integer less than four. In the alkylene group —(O—$C_nH_{2n}$)— there is a chain of at least two carbon atoms between successive oxygen atoms and also between the halogen atom and the next oxygen atom in the chain.

The reaction is applicable to aryl ether halides of the general formula given above in which the nucleus of R' contains a replaceable hydrogen atom. Thus, R' may be a mononuclear or polynuclear aromatic residue. It may contain nuclear substituents which are relatively inert in the Friedel-Crafts reactions, such as hydrocarbon, alkoxy, or halogen groups.

In practicing this invention, it has been found advantageous to mix the Friedel-Crafts condensing agent preferably with an inert organic solvent, such as carbon bisulfide, petroleum ether, nitrobenzene, chlorobenzene, or benzene and then to add the acylating agent, admixed with the aromatic ether halide, gradually to the well-stirred mixture. The temperature is kept low at the beginning of the reaction and may be increased after the reaction has proceeded for some time. The products are then isolated in the usual manner of Friedel-Crafts reactions by decomposition with water, acids, or alkalies, and separation and purification of the desired substance.

Other Friedel-Crafts type condensing agents may be used such as anhydrous aluminum bromide, boron fluoride, ferric chloride, antimony chloride, stannic chloride or titanium chloride, but we prefer to use anhydrous aluminum chloride.

Furthermore, the corresponding compounds wherein Y is bromine or iodine can be employed but the products obtained are less pure than those where Y is chlorine, due to a certain tendency to lose hydrobromic acid or hydriodic acid during the condensation.

In order to illustrate this invention more clearly, the following examples are given, but it is understood that the invention is not limited to these examples and that it may be applied to the obvious homologs and analogs of the components used.

EXAMPLE 1

*o-(β-chloroethoxyethoxy-benzoyl)-benzoic acid*

To a mixture consisting of 50 g. of phthalic anhydride, 90 g. of anhydrous powdered aluminum chloride and 250 cc. of carbon disulfide in a vessel fitted with a stirrer and reflux condenser, there was added gradually 68 g. of β-phenoxy-β'-chloro-diethyl ether while stirring the reaction mixture. The temperature was maintained at gentle refluxing during the addition, and for five hours thereafter, during which time hydrochloric acid was copiously evolved. The carbon disulfide was then distilled off on a water bath. The product was decomposed with 250 cc. of 3-N-hydrochloric acid on ice, giving a white precipitate which was filtered off and dried. It was purified by dissolving in 10% sodium carbonate solution, filtering and extracting oily impurities with ether. Upon removal of the ether by boiling, the clear alkaline solution obtained was acidified with hydrochloric acid. The waxy precipitate, which at first formed, gradually solidified to a hard, white mass. Upon recrystallization from glacial acetic acid, the product formed colorless needles melting at 123° to 124° C. It has the probable formula:

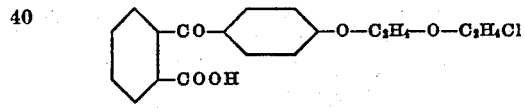

EXAMPLE 2

*(β-chloroethoxy-ethoxy)-benzoyl-propionic acid*

33 g. of succinic anhydride and 90 g. of anhydrous aluminum chloride were stirred together in 200 cc. of carbon disulfide. The mixture was heated on the steam bath to gentle refluxing, and then 67 g. of β-phenoxyethoxy ethyl chloride was gradually run in at such a rate that the heat of reaction maintained the reaction mixture at a steady reflux temperature. The mixture was stirred for 5 hours at this temperature and then worked up as in Example 1, except that the final product was crystallized from benzene twice and three times from ethylene dichloride. It formed colorless crystals melting at 95° C., and has the probable formula:

EXAMPLE 3

33 g. of maleic anhydride and 90 g. of anhydrous aluminum chloride in 250 cc. of carbon disulfide were reacted with 67 g. of β-phenoxyethoxyethyl chloride, as described in Example 2. The crude air-dried product, obtained by acidifying the reaction residue after removal of the carbon disulfide by distillation, was stirred with a solution of 50 g. of sodium carbonate in 1200 cc. of water in the cold, and the resultant solution filtered. The clear filtrate gave, upon acidification with dilute hydrochloric acid, a yellow precipitate of the desired product. The product was crystallized twice from benzene, giving pale yellow crystals melting at 100° C. It consists of (β-chloroethoxyethoxy)-benzoyl acrylic acid,

EXAMPLE 4

*o-(β-chloroethoxy-benzoyl)-benzoic acid*

49 g. of phthalic anhydride and 90 g. of anhydrous aluminum chloride in 200 cc. of carbon disulfide were reacted with 52 g. of β-chloroethoxybenzene, and the product worked up as described in Example 1. The product was crystallized from benzene, giving colorless crystals melting at about 145° C. and having the probable formula:

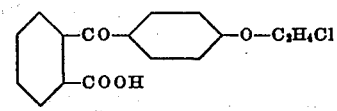

EXAMPLE 5

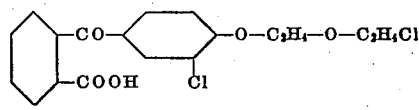

78 g. of β-o-chlorophenoxy-β'-chlorodiethyl ether was slowly added to 49 g. of phthalic anhydride and 90 g. of anhydrous aluminum chloride in 200 g. of carbon disulfide. The reaction mixture was stirred and heated for 5 hours on a steam bath under reflux, and then worked up as described in Example 1. The product was crystallized from glacial acetic acid and formed colorless crystals melting at about 85° C.

EXAMPLE 6

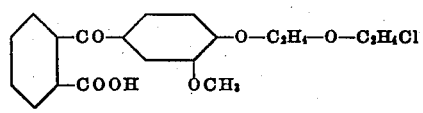

77 g. of β-o-methoxyphenoxy-β'-chlorodiethyl ether was slowly added to 49 g. of phthalic anhydride and 90 g. of anhydrous aluminum chloride in 200 g. of carbon disulfide. After 4 hours' boiling on the steam bath, the product was worked up as in Example 1. After crystallization from glacial acetic acid, it formed colorless crystals melting at 188° to 190° C.

EXAMPLE 7

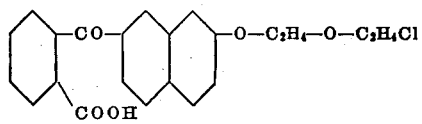

76 g. of β-2-naphthoxy-β'-chlorodiethyl ether were slowly added to 49 g. of phthalic anhydride and 90 g. of anhydrous aluminum chloride in 200 g. of carbon disulfide. The mixture was boiled 6 hours under reflux and worked up as in Example 1. The product was crystallized first from benzene and then from glacial acetic acid. Colorless crystals, M. P. 125° C.

EXAMPLE 8

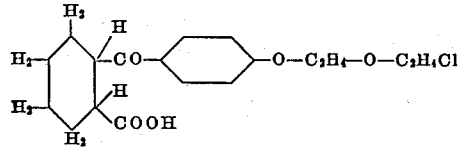

A solution consisting of 67 g. of β-phenoxy-β'- chlorodiethyl ether and 31 g. of hexahydrophthalic anhydride was slowly added to 90 g. of anhydrous aluminum chloride in 200 g. of carbon disulfide. After the initial reaction, the mixture was heated 5 hours on the steam bath and then the carbon disulfide was distilled off. The reaction residue was decomposed with dilute hydrochloric acid to yield an oil which was extracted with dilute sodium carbonate solution. This extract was shaken with ether to remove neutral impurities, the solution clarified with bone black, filtered and acidified. A white, waxy mass precipitated, which could not be crystallized. When dried at 100° in vacuo, it formed a transparent, colorless, glassy mass. Found 10.5% chlorine. Theory 10.03% chlorine.

Example 9

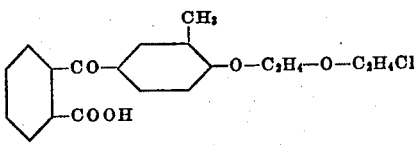

71 g. of β-o-methylphenoxy-β'-chlorodiethyl ether were slowly added to 49 g. of phthalic anhydride and 90 g. of anhydrous aluminum chloride in 200 cc. of carbon disulfide. After the initial reaction had subsided, the mixture was boiled on a steam bath under reflux for 5 hours and worked up as in Example 1. The product was crystallized from acetic acid. It formed colorless crystals, M. P. 87° to 88.5°.

The above examples yield new ketonic acids of the general formula:

$$HOOC-R'-CO-R-(O-C_nH_{2n})_xY$$

wherein R' is a divalent hydrocarbon radical having at least two carbon atoms, R is an aromatic nucleus of the benzene and naphthalene series, $n$ is an integer greater than one and $x$ is an integer less than four, and Y is a halogen atom.

Example 10

A solution consisting of 67 g. of β-phenoxy-β'-chlorodiethyl ether and 40 g. of thionyl chloride was slowly added to 45 g. of anhydrous aluminum chloride in 200 cc. of carbon disulfide. During the addition, the reaction mixture was cooled in an ice bath. The mixture was stirred 4 hours at room temperature and then decomposed with dilute hydrochloric acid. The carbon disulfide was then distilled off. The residual product was a thick oil, which could not be distilled, and consisted essentially of

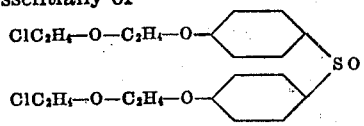

Example 11

β-acetylphenoxy-β'-chlorodiethyl ether

To a mixture of 50 g. of anhydrous aluminum chloride and 200 cc. of carbon disulfide cooled in an ice bath, there was added slowly, with stirring, a mixture of 67 g. of β-phenoxy-β'-chlorodiethyl ether and 16.5 g. of acetyl chloride. The mixture was stirred for one hour at 0° C. to 5° C., then allowed to warm to room temperature, and stirred for 2 hours thereafter. The mass was decomposed with ice and hydrochloric acid, the carbon disulfide distilled off, and the oil separated, washed and distilled in vacuo. The product came over as a colorless oil at 210° to 225° C/10 mm., which, upon standing, turned red. Its analysis indicated a purity of 95%.

The same product is obtained by using 90 g. of aluminum chloride, 200 g. of carbon disulfide, 67 g. of β-phenoxy-β'-chloro-diethyl ether and 34 g. of acetic anhydride in the manner described above.

The acetyl chloride and acetic anhydride can be replaced mol for mol by the corresponding longer chain homologs, such as lauroyl chloride, stearoyl chloride, caproyl chloride, butyric anhydride, propionic anhydride, and the like.

Example 12

67 g. of phenoxy-ethoxy ethyl chloride and 49 g. of phthalic anhydride were stirred in 400 cc. of dry benzene; not all the phthalic anhydride dissolved. This mixture was cooled in a bath of tap water while 45 g. of aluminum chloride were added with stirring.

The reaction mixture was stirred for 8 hours at room temperature, during which time a red, viscous mass formed, which was insoluble in the benzene but which could be stirred. The reaction mixture was decomposed with dilute hydrochloric acid, the benzene distilled out with steam and the oil separated from the aqueous solution. This oil was extracted with sodium carbonate solution. Acidification of the sodium carbonate solution gave a white precipitate which as filtered off and air-dried, giving 40 g. of a product melting at 123° to 124.3° C. and containing 10.09% chlorine. This product was the (p-β-chloroethoxyethoxy) benzoyl-o-benzoic acid.

The products obtained by the process herein set forth are useful as dyestuff intermediates.

The labile halogen atom on the terminal carbon atom of the ether chain of the compounds obtained by the present process can be reacted with metal sulfites to produce sulfonates; with sodium sulfide to produce thioethers; with alkali metal salts of fatty acids to form esters; with sodium hydrosulfide to produce mercaptans; with primary, secondary, or tertiary amines to form substituted amines or quaternary ammonium salts; with inorganic thiocyanates or dithiocarbamates to yield organic thiocyanates or thiocarbamates. The free carboxyl groups, in turn, can be converted into salts, esters, amides, acid chlorides, and other characteristic carboxyl derivatives. The above compounds and their derivatives may thus find wide application as capillary-active compounds, textile assistants, plasticizers, resins, insecticides, and drugs, depending upon the groupings present.

We claim:

1. A compound obtained by condensing an acylating agent with an aromatic ether halide of the general formula $$R-(O-C_nH_{2n})_xY$$

in which R is an aromatic hydrocarbon radical of the benzene and naphthalene series having a replaceable nuclear hydrogen atom, $n$ is a small integer greater than one, $x$ is an integer less than four and Y is a halogen atom, in the presence of a Friedel-Crafts condensing agent.

2. A chemical compound having the general formula $$R-R'-(O-C_nH_{2n})_xY$$

in which R is an acyl group, R' is an aromatic radical of the benzene and naphthalene series, $n$ is a small integer greater than one, $x$ is an integer less than four and Y is a halogen atom.

3. A chemical compound having the general formula $$R-R'-(O-C_nH_{2n})_xCl$$

in which R is an acyl group, R' is an aromatic radical of the benzene and naphthalene series, n is a small integer greater than one, and x is an integer less than four.

4. A chemical compound having the general formula $$R-R'-(O-C_2H_4)_xCl$$

in which R is an acyl group, R' is an aromatic hydrocarbon radical of the benzene and naphthalene series and x is an integer less than four.

5. A chemical compound having the general formula $$R-R'-(O-C_2H_4)_xCl$$

in which R is an acyl group, R' is an aromatic radical of the benzene series and x is an integer less than four.

6. A chemical compound having the general formula $$R-R'-O-C_2H_4-O-C_2H_4Cl$$

in which R is an acyl group and R' is an aromatic radical of the benzene and naphthalene series.

7. A chemical compound having the general formula $$R-R'-O-C_2H_4-O-C_2H_4Cl$$

in which R is an acyl group and R' is an aromatic radical of the benzene series.

8. A chemical compound having the general formula $$R-R'-O-C_2H_4-O-C_2H_4Cl$$

in which R is an acyl group and R' is a phenylene radical.

9. A chemical compound having the general formula $$R-CO-R'-(O-C_nH_{2n})_xCl$$

in which R is a hydrocarbon radical, R' is an aromatic radical of the benzene and naphthalene series, n is a small integer greater than one and x is an integer less than four.

10. A chemical compound having the general formula $$R-CO-R'-(O-C_2H_4)_xCl$$

in which R is an aliphatic radical, R' is an aromatic hydrocarbon radical of the benzene and naphthalene series and x is an integer less than four.

11. A chemical compound having the general formula $$R-CO-R'-(O-C_2H_4)_xCl$$

in which R and R' are both aromatic radicals of the benzene series nuclearly attached to the carbonyl group, and x is an integer less than four.

12. A chemical compound having the general formula $$R-CO-R'-O-C_2H_4-O-C_2H_4Cl$$

in which R is a hydrocarbon radical and R' is an aromatic radical of the benzene and naphthalene series.

13. A chemical compound having the general formula $$R-CO-R'-O-C_2H_4-O-C_2H_4Cl$$

in which R is an aliphatic radical and R' is an aromatic hydrocarbon radical of the benzene and naphthalene series.

14. A chemical compound having the general formula $$R-CO-R'-O-C_2H_4-O-C_2H_4Cl$$

in which R and R' are aromatic radicals of the benzene series nuclearly attached to the carbonyl group.

15. A chemical compound having the general formula $$HOOC-R-CO-R'-(O-C_nH_{2n})_xCl$$

in which R is a hydrocarbon radical, R' is an aromatic radical of the benzene and naphthalene series, n is a small integer greater than one and x is an integer less than four.

16. A chemical compound having the general formula $$HOOC-R-CO-R'-(O-C_2H_4)_xCl$$

in which R is an aliphatic radical, R' is an aromatic hydrocarbon radical of the benzene series and x is an integer less than four.

17. A chemical compound having the general formula $$HOOC-R-CO-R'-(O-C_2H_4)_xCl$$

in which R is an aromatic radical of the benzene series, R' is an aromatic radical of the benzene and naphthalene series and x is an integer less than four.

18. A chemical compound having the general formula $$HOOC-R-CO-R'-(O-C_2H_4)_xCl$$

in which R and R' are aromatic radicals of the benzene series and x is an integer less than four.

19. A chemical compound having the general formula $$HOOC-R-CO-R'-O-C_2H_4-O-C_2H_4Cl$$

in which R is a hydrocarbon radical and R' is an aromatic radical of the benzene and naphthalene series.

20. A chemical compound having the general formula $$HOOC-R-CO-R'-O-C_2H_4-O-C_2H_4Cl$$

in which R is an aliphatic radical and R' is an aromatic radical of the benzene and naphthalene series.

21. A chemical compound having the general formula $$HOOC-R-CO-R'-O-C_2H_4-O-C_2H_4Cl$$

in which R and R' are aromatic radicals of the benzene series.

22. A chemical compound having the general formula $$HOOC-R-CO-R'-O-C_2H_4-O-C_2H_4Cl$$

in which R and R' are phenylene radicals.

23. The process which comprises condensing an acylating agent with an aromatic ether halide in the presence of a Friedel-Crafts condensing agent, said ether halide having the general formula $$R'-(O-C_nH_{2n})_xY$$

in which R' is an aromatic radical of the benzene and naphthalene series having a replaceable nuclear hydrogen atom, n is a small integer greater than one, x is an integer less than four and Y is a halogen atom.

24. The process which comprises condensing an acylating agent with an aromatic ether halide in the presence of a Friedel-Crafts condensing agent, said ether halide having the general formula $$R'-(O-C_nH_{2n})_xY$$

in which R' is an aromatic radical of the benzene and naphthalene series having a replaceable nuclear hydrogen atom, n is a small integer greater than one, x is an integer less than four and Y is a halogen atom, said acylating agent being derived from an organic carboxylic acid.

25. The process which comprises condensing an acylating agent with an aromatic ether halide in the presence of a Friedel-Crafts condensing agent, said ether halide having the general formula $$R'-(O-C_nH_{2n})_xY$$

in which R' is an aromatic radical of the benzene and naphthalene series having a replaceable nuclear hydrogen atom, n is a small integer greater than one, x is an integer less than four and Y is a halogen atom, said acylating agent being derived from an organic dicarboxylic acid.

26. The process which comprises condensing an acylating agent with an aromatic ether chloride in the presence of a Friedel-Crafts condensing agent, said ether chloride having the general formula $$R'-(O-C_2H_4)_xCl$$

in which R' is an aromatic radical of the benzene and naphthalene series and x is an integer less than four and said acylating agent is the anhydride of a carboxylic acid.

27. The process which comprises condensing an acylating agent with an aromatic ether chloride in the presence of a Friedel-Crafts condensing agent, said ether chloride having the general formula $$R'-(O-C_2H_4)_xCl$$

in which R' is an aromatic radical of the benzene and naphthalene series and x is an integer less than four and said acylating agent is the chloride of a carboxylic acid.

28. The process which comprises condensing an acylating agent with an aromatic ether chloride in the presence of a Friedel-Crafts condensing agent, said ether chloride having the general formula $$R'-(O-C_2H_4)_xCl$$

in which R' is an aromatic radical of the benzene and naphthalene series and x is an integer less than four and said acylating agent is the anhydride of a dicarboxylic acid.

29. The process which comprises condensing an acylating agent with an aromatic ether chloride in the presence of a Friedel-Crafts condensing agent, said ether chloride having the general formula $$R'-O-C_2H_4-O-C_2H_4Cl$$

in which R' is an aromatic radical of the benzene series and said acylating agent is the anhydride of a carboxylic acid.

30. The process which comprises condensing an acylating agent with an aromatic ether chloride in the presence of a Friedel-Crafts condensing agent, said ether chloride having the general formula $$R'-O-C_2H_4-O-C_2H_4Cl$$

in which R' is an aromatic radical of the benzene series and said acylating agent is the anhydride of a dicarboxylic acid.

31. The process which comprises condensing an acylating agent with an aromatic ether chloride in the presence of a Friedel-Crafts condensing agent, said ether chloride having the general formula $$R'-(O-C_2H_4)_xCl$$

in which R' is an aromatic radical of the benzene series and x is an integer less than four and said acylating agent is the anhydride of an aromatic dicarboxylic acid.

32. The process which comprises condensing an acylating agent with an aromatic ether chloride in the presence of a Friedel-Crafts condensing agent, said ether chloride having the general formula $$R'-O-C_2H_4-O-C_2H_4Cl$$

in which R' is an aromatic radical of the benzene series and said acylating agent is the anhydride of an aromatic dicarboxylic acid.

HERMAN A. BRUSON.
JOHN W. EASTES.